(12) United States Patent
Hokenek et al.

(10) Patent No.: US 8,959,315 B2
(45) Date of Patent: *Feb. 17, 2015

(54) MULTITHREADED PROCESSOR WITH MULTIPLE CONCURRENT PIPELINES PER THREAD

(75) Inventors: Erdem Hokenek, Yorktown Heights, NY (US); Mayan Moudgill, White Plains, NY (US); Michael J. Schulte, Madison, WI (US); C. John Glossner, Carmel, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/579,867

(22) Filed: Oct. 15, 2009
(Under 37 CFR 1.47)

(65) Prior Publication Data
US 2010/0122068 A1      May 13, 2010

Related U.S. Application Data

(63) Continuation of application No. 11/096,917, filed on Apr. 1, 2005, now Pat. No. 8,074,051.

(60) Provisional application No. 60/560,199, filed on Apr. 7, 2004.

(51) Int. Cl.
   G06F 9/38      (2006.01)
   G06F 9/30      (2006.01)

(52) U.S. Cl.
   CPC ............ *G06F 9/3851* (2013.01); *G06F 9/3893* (2013.01); *G06F 9/30036* (2013.01); *G06F 9/30123* (2013.01)
   USPC ....................................................... 712/220

(58) Field of Classification Search
   None
   See application file for complete search history.

(56) References Cited

U.S. PATENT DOCUMENTS

| 4,001,692 A | 1/1977 | Fenwick et al. |
| 4,706,211 A | 11/1987 | Yamazaki et al. |

(Continued)

FOREIGN PATENT DOCUMENTS

| EP | 0444088 | 9/1991 |
| EP | 0 725 334 | 8/1996 |

(Continued)

OTHER PUBLICATIONS

Loikkanen, Mat, Bagherzadeh, Nader. "A fine-grain multithreading superscalar architecture" IEEE 1996.*

(Continued)

*Primary Examiner* — Jacob A Petranek
(74) *Attorney, Agent, or Firm* — Knobbe Martens Olson & Bear LLP

(57) ABSTRACT

A multithreaded processor comprises a plurality of hardware thread units, an instruction decoder coupled to the thread units for decoding instructions received therefrom, and a plurality of execution units for executing the decoded instructions. The multithreaded processor is configured for controlling an instruction issuance sequence for threads associated with respective ones of the hardware thread units. On a given processor clock cycle, only a designated one of the threads is permitted to issue one or more instructions, but the designated thread that is permitted to issue instructions varies over a plurality of clock cycles in accordance with the instruction issuance sequence. The instructions are pipelined in a manner which permits at least a given one of the threads to support multiple concurrent instruction pipelines.

29 Claims, 4 Drawing Sheets

(56) References Cited

U.S. PATENT DOCUMENTS

| | | | |
|---|---|---|---|
| 4,769,779 | A | 9/1988 | Chang et al. |
| 5,181,184 | A | 1/1993 | Shim et al. |
| 5,404,469 | A | 4/1995 | Chung et al. |
| 5,613,114 | A | 3/1997 | Anderson et al. |
| 5,864,703 | A | 1/1999 | Van Hook et al. |
| 5,889,689 | A | 3/1999 | Alidina et al. |
| 5,907,702 | A | 5/1999 | Flynn et al. |
| 5,949,996 | A | 9/1999 | Atsushi |
| 5,958,041 | A | 9/1999 | Petolino et al. |
| 5,983,256 | A | 11/1999 | Peleg et al. |
| 5,991,785 | A | 11/1999 | Alidina et al. |
| 6,078,941 | A | 6/2000 | Jiang et al. |
| 6,092,175 | A | 7/2000 | Levy et al. |
| 6,161,166 | A | 12/2000 | Doing et al. |
| 6,182,105 | B1 | 1/2001 | Kolagotla et al. |
| 6,212,544 | B1 | 4/2001 | Borkenhagen et al. |
| 6,295,600 | B1 | 9/2001 | Parady |
| 6,377,619 | B1 | 4/2002 | Denk et al. |
| 6,470,443 | B1 | 10/2002 | Emer et al. |
| 6,530,010 | B1 | 3/2003 | Hung et al. |
| 6,530,014 | B2 * | 3/2003 | Alidina et al. ............... 712/221 |
| 6,557,022 | B1 | 4/2003 | Sih et al. |
| 6,606,704 | B1 | 8/2003 | Adiletta et al. |
| 6,687,724 | B1 | 2/2004 | Mogi et al. |
| 6,694,425 | B1 | 2/2004 | Eickemeyer |
| 6,697,935 | B1 | 2/2004 | Borkenhagen et al. |
| 6,842,848 | B2 | 1/2005 | Hokenek et al. |
| 6,898,694 | B2 | 5/2005 | Kottapalli et al. |
| 6,904,511 | B2 | 6/2005 | Hokenek et al. |
| 6,912,623 | B2 | 6/2005 | Hokenek et al. |
| 6,925,643 | B2 | 8/2005 | Hokenek et al. |
| 6,968,445 | B2 | 11/2005 | Hokenek et al. |
| 6,971,103 | B2 | 11/2005 | Hokenek et al. |
| 6,973,471 | B2 * | 12/2005 | Nguyen ...................... 708/627 |
| 6,990,557 | B2 | 1/2006 | Hokenek et al. |
| 7,251,737 | B2 | 7/2007 | Weinberger et al. |
| 7,360,064 | B1 | 4/2008 | Steiss et al. |
| 7,428,567 | B2 | 9/2008 | Schulte et al. |
| 7,475,222 | B2 | 1/2009 | Glossner et al. |
| 7,593,978 | B2 | 9/2009 | Schulte et al. |
| 7,797,363 | B2 | 9/2010 | Hokenek et al. |
| 7,873,815 | B2 | 1/2011 | Sih et al. |
| 2001/0047468 | A1 | 11/2001 | Parady |
| 2002/0038416 | A1 | 3/2002 | Fotland et al. |
| 2003/0041228 | A1 | 2/2003 | Rosenbluth et al. |
| 2006/0095729 | A1 | 5/2006 | Hokenek et al. |
| 2009/0193279 | A1 | 7/2009 | Moudgill et al. |
| 2009/0235032 | A1 | 9/2009 | Hoane |
| 2009/0276432 | A1 | 11/2009 | Hokenek et al. |
| 2010/0031007 | A1 | 2/2010 | Moudgill |
| 2010/0115527 | A1 | 5/2010 | Kotlyar et al. |
| 2010/0199073 | A1 | 8/2010 | Hokenek et al. |
| 2010/0199075 | A1 | 8/2010 | Hokenek et al. |
| 2010/0241834 | A1 | 9/2010 | Moudgill |
| 2010/0299319 | A1 | 11/2010 | Parson et al. |

FOREIGN PATENT DOCUMENTS

| | | |
|---|---|---|
| EP | 0793168 | 9/1997 |
| GB | 2 389 433 | 12/2003 |
| KR | 19970012141 | 3/1997 |
| KR | 305310 B | 9/2001 |
| WO | WO 01/61860 | 8/2001 |
| WO | WO 03/019358 | 3/2003 |

OTHER PUBLICATIONS

Brunett, Sharon, Thornley, John, Ellenbecker, Marrq. "An initial evaluation of the Tera multithreaded architecture and programming system using the C31 parallel benchmark suite" Proceedings of the 1998 ACM/IEEE SC98 Conference.*

Sato et al., Thread-based Programming for the EM-4 Hybrid Dataflow Machine, Proc. Int'l Symp. Computer Architecture 19, pp. 146-155 (May 19, 1992).

Diep et al., Performance Evaluation of the PowerPC 620 Microarchitecture, Proceedings of the 22nd. Annual Symposium on Computer Architecture, ACM, vol. 22, Feb. 22, 1995, pp. 163-174.

Ackland et al., Mar. 2000, A single-chip, 1.6-billion, 16-b MAC/s multiprocessor DSP, IEEE, 35(3):412-424.

Alverson et al., 1990, The Tera computer system, ACM, pp. 1-6.

Alverson et al., Jan. 1, 1992, Exploiting heterogeneous parallelism on a multithreaded multiprocessor, International Conference on Supercomputing, ACM, pp. 188-193.

Glossner et al., Mar. 4, 2004, 6. The Sandbridge sandblaster communications processor, Software Defined Radio: Baseband Technologies for 3G Handsets and Basestations, John Wiley & Sons, Ltd., pp. 129-159.

Shen et al., 2003, Modern Processor Design, McGraw Hill, pp. 106, 232-233.

Snavely et al, 1998, Multi-processor performance on the Tera MTA, Proceedings of the 1998 ACM/IEEE SC98 Conference, pp. 11.

Office Action dated Sep. 7, 2010 in U.S. Appl. No. 12/579,867.

IPRP dated Oct. 19, 2006 in PCT/US05/11614.

Official Communication dated Feb. 24, 2009 in European App. No. 05732166.3.

Office Action dated Aug. 20, 2007 in U.S. Appl. No. 11/096,917.

Office Action dated May 21, 2008 in U.S. Appl. No. 11/096,917.

Office Action dated Jan. 29, 2009 in U.S. Appl. No. 11/096,917.

Office Action dated Jun. 15, 2009 in U.S. Appl. No. 11/096,917.

Office Action dated Mar. 22, 2010 in U.S. Appl. No. 11/096,917.

Extended European Search Report dated Jul. 26, 2011 in App. No. 11001888.4.

Extended European Search Report dated Jul. 28, 2011 in App. No. 11001890.0.

Extended European Search Report dated Jul. 26, 2011 in App. No. 11001889.2.

Balzola et al., Sep. 26, 2001, Design alternatives for parallel saturating multioperand adders, Proceedings 2001 International Conference on Computer Design, pp. 172-177.

Balzola, Apr. 2003, Saturating arithmetic for digital signal processors, PhD Thesis, Lehigh University.

Glossner et al, 2000, Trends in compilable DSP architecture, IEEE Workshop in Signal Processing Systems, pp. 1-19.

Glossner et al., Apr. 2001, Towards a very high bandwidth wireless battery powered device, IEEE Computer Society Workshop in VLSI, pp. 3-9.

Glossner et al., Nov. 2002, A multithreaded processor architecture for SDR, The Proceedings of the Korean Institute of Communication Sciences, 19(11):70-84.

Glossner et al., Nov. 11-12, 2002, Multi-threaded processor for software-defined radio, Proceedings of the 2002 Software Defined Radio Technical Conference, vol. 1, 6 pp.

Glossner et al., Jan. 2003, A software defined communications baseband design, IEEE Communications Magazine, 41(1):120-128.

Glossner et al., Sep. 22, 23, 2003, Multiple communication protocols for software defined radio, IEEE Colloquium on DSP Enable Radio, ISIL, Livingston, Scotland, pp. 227-236.

Hennessey et al., 2003, Computer architecture: a quantitative approach, 3rd ed., Morgan Kaufmann Publishers, Appendix A, section A.5, "Extending the MIPS Pipeline to Handle Multicycle Operations," pp. A-47-A-57.

Jinturkar et al., Mar. 31-Apr. 3, 2003, Programming the Sandbridge multithreaded processor, Proceedings of the 2003 Global Signal Processing Expo (GSPx) and International Signal Processing Conference (ISPC), Dallas, Tx.

Moreno et al., Sep. 15, 2002, IBM Research Report RC22568—an innovative low-power high-performance programmable signal processor for digital communications, 31 pp.

Peleg et al., Aug. 1, 1995, MMX technology extension to the Intel architecture, IEEE Micro, 16(4):42-50.

Schulte et al., Nov. 19, 2000, Parallel saturating multioperand adders, Cases '00, pp. 172-179.

Schulte et al., Nov. 2004, A low-power multithreaded processor for baseband communication systems, Lecture Notes in Computer Science, 3133:393-402.

Ungerer, Mar. 2003, A survey of processors with explicit multithreading, ACM Computing Surveys, 35(1):29-63.

(56) References Cited

OTHER PUBLICATIONS

Office Action dated Oct. 29, 2010 in U.S. Appl. No. 12/579,893.
Office Action dated Mar. 9, 2011 in U.S. Appl. No. 12/579,893.
Office Action dated Oct. 14, 2010 in U.S. Appl. No. 12/579,912.
Office Action dated Feb. 24, 2011 in U.S. Appl. No. 12/579,912.
ISR and WO dated Aug. 12, 2005 in PCT/US05/11614.
Supplementary Search Report dated Jun. 9, 2008 in European App. No. 05732166.3.
Official Communication dated Dec. 10, 2009 in European App. No. 05732166.3.
Summons to attend oral proceedings dated Oct. 27, 2010 in European App. No. 05732166.3.
Decision to refuse dated Apr. 14, 2011 in European App. No. 05732166.3.
Notice to File a Response dated Jun. 23, 2011 in Korean App. No. 10-2006-7022996.
Blaauw et al., 1997, Computer Architecture: Concepts and Evolution, Addison-Wesley, Reading, Mass., 7 pp.
Glossner et al., Sep. 2004, Sandblaster Low-Power Multithreaded SDR Baseband Processor, Proceedings of the 3rd Workshop on Applications Specific Processors (WASP'04), Stockholm, Sweden, pp. 53-58.
Office Action dated Nov. 17, 2011 in U.S. Appl. No. 12/579,893.
Official Communication dated Jul. 3, 2012 in App. No. 11001888.4.
Official Communication dated Jul. 16, 2012 in App. No. 11001890.0.
Official Communication dated Jul. 3, 2012 in App. No. 11001889.2.
Office Action dated Oct. 24, 2012, in U.S. Appl. No. 12/579,912.
Office Action dated Oct. 18, 2012 in U.S. Appl. No. 13/282,800.
Hennessy J. L., et al."Computer Architecture: A Quantitative Approach" 3rd Edition, May 17, 2002, pp. 608-609.
Microsoft Computer Dictionary, 5th edition, 2002 p. 458.
Notice to File a Response dated Feb. 27, 2012 in Korean App. No. 10-2006-7022996.
Office Action dated Mar. 9, 2012, in U.S. Appl. No. 12/579,912.
Office Action dated Apr. 18, 2012 in U.S. Appl. No. 12/579,893.
Notice to File a Response dated Nov. 27, 2012 in Korean App. No. 10-2012-7022421.
Notice to File a Response dated Nov. 27, 2012 in Korean App. No. 10-2012-7022422.
Diefendorff K., et al., "AltiVec Extension to PowerPC Accelerates Media Processing", IEEE Micro, vol. 20, No. 2, pp. 85-95, Mar. 2000.
Kim Y., et al., "A Low Power Carry Select Adder with Reduced Area", Proceedings of IEEE International Symposium on Circuits and Systems, pp. IV-218-IV-221, 2001.
Lee R.B., "Subword Permutation Instructions for Two-Dimensional Multimedia Processing in MicroSIMD Architectures", Proceedings of the IEEE 11.sup.th International Conference on Application-Specific Systems, Architectures and Processor, pp. 3-14, Jul. 2000.
Tullsen, D.M. et al., Simultaneous Multithreading: Maximizing On-Chip Parallelism, 1995, ACM, pp. 392-403.
Tyagi A., "A Reduced-Area Scheme for Carry-Select Adders", IEEE Transactions on Computers, vol. 42, No. 10, pp. 1163-1170, Oct. 1993.
Yadav N., et al., "Parallel Saturating Fractional Arithmetic Units", Proceedings of the Ninth Great Lakes Symposium on VLSI, pp. 214-217, Mar. 1999.
SGS—Thomson Microelectronics, Jul. 1995, 16-48K ROM HCMOS MCU with on screen display and voltage tuning output, 22 pp.
International Search Report for PCT Patent Application No. PCT/US05/11614, Aug. 12, 2005.
European Patent Office Search Report for EPC Patent Application No. 05732166.3, Feb. 24, 2009.
Basic Features of the HEP Supercomputer, http://www-ee.eng.hawaii.edu/~nava/HEP/introduction.html, Mar. 6, 2001.

\* cited by examiner

FIG. 6

|  | 0 | 1 | 2 | 3 | 4 | 5 | 6 | 7 | 8 | 9 | 10 |
|---|---|---|---|---|---|---|---|---|---|---|---|
| Ld/St | INST DEC | RF READ | AGEN | XFER | INT EXT | MEM 0 | MEM 1 | MEM 2 | WB | | |
| ALU | INST DEC | WAIT | RF READ | EXEC1 | EXEC2 | XFER | WB | | | | |
| I_Mul | INST DEC | WAIT | RF READ | EXEC1 | EXEC2 | EXEC3 | XFER | WB | | | |
| V_Mul | INST DEC | VRF READ | MPY1 | MPY2 | ADD1 | ADD2 | XFER | WB | | | |
| V_Mul REDUCE | INST DEC | VRF READ | MPY1 | MPY2 | ADD1 | ADD2 ACC READ | REDUCE 1 | REDUCE 2 | REDUCE 3 | REDUCE 4 | ACC WB |

FIG. 7

| 5 | 6 | 7 | 8 | 9 | 10 | 11 | 12 | 13 |
|---|---|---|---|---|---|---|---|---|
| ADD2 ACC READ | REDUCE 1 | REDUCE 2 | REDUCE 3 | REDUCE 4 | ACC WB | | | |
| | | | INST DEC | VRF READ | MPY1 | MPY2 | ADD1 | ADD2 ACC READ |

MULTITHREADED PROCESSOR WITH MULTIPLE CONCURRENT PIPELINES PER THREAD

CROSS-REFERENCE TO RELATED APPLICATIONS

The present application is a continuation application of U.S. patent application Ser. No. 11/096,917, filed Apr. 1, 2005, which claims the priority of U.S. Provisional Application Ser. No. 60/560,199, filed Apr. 7, 2004 and entitled "Processor Pipeline With Multithreaded Support," which is incorporated by reference herein.

The present application is also related to U.S. patent application Ser. No. 10/841,261, filed May 7, 2004 and entitled "Processor Reduction Unit for Accumulation of Multiple Operands With or Without Saturation," which is incorporated by reference herein. The present application is further related to U.S. patent application Ser. No. 12/579,912, filed Oct. 15, 2009 and entitled "Multithreaded Processor with Multiple Concurrent Pipelines per Thread." The present application is also related to U.S. patent application Ser. No. 12/579,893, filed Oct. 15, 2009 and entitled "Multithreaded Processor with Multiple Concurrent Pipelines per Thread."

FIELD OF THE INVENTION

The present invention relates generally to the field of digital data processors, and more particularly to multithreading and pipelining techniques for use in a digital signal processor (DSP) or other type of digital data processor.

BACKGROUND OF THE INVENTION

Pipelining is a well-known processor implementation technique whereby multiple instructions are overlapped in execution. Conventional pipelining techniques are described in, for example, John L. Hennessy and David A. Patterson, "Computer Architecture: A Quantitative Approach," Third Edition, Morgan Kaufmann Publishers, Inc., San Francisco, Calif., 2003.

FIG. 1A shows an example involving the execution of two instructions without any overlap. In this example, the two instructions are an integer add instruction addi r0, r2, 8, and an integer multiplication instruction muli r8, r3, 4. The first instruction, addi, performs an addition of the contents of register r2 and an immediate value 8, and stores the result in register r0. It is assumed for simplicity and clarity of illustration that each of the instructions includes the same four pipeline stages, denoted instruction fetch (IF), read (RD), execute (EX) and writeback (WB).

In the first stage (IF) instructions are fetched from memory and decoded. In the second stage (RD) the operands are read from the register file. In the third stage (EX) the addition is performed. Finally, in the fourth stage (WB) the results are written back into the register file at location r0. When the addi instruction has completed, the next instruction muli is started. The muli instruction performs an addition of the contents of register r3 and an immediate value 4, and stores the result in register r8.

FIG. 1B shows the same two instructions but depicts how they may be overlapped using a conventional pipelining technique. Each of the pipeline stages (IF, RD, EX and WB) is generally executed on a clock boundary. The second instruction, muli, may be started on the second clock cycle without requiring additional hardware. The hardware associated with the IF, RD, EX and WB stages are shared between the two instructions, but the stages of one instruction are shifted in time relative to those of the other.

FIG. 2 illustrates a complication that may arise in a pipeline implementation. In this example, the muli instruction requires as an operand the contents of register r0, and thus cannot read r0 until the addi instruction has computed and written back the result of the addition operation to r0. Processing of the muli instruction begins on the next clock cycle following the start of the addi instruction, but this process must stall and wait for the execution and writeback stages of the addi instruction to complete. The empty cycles the muli instruction must wait for its operands to become available are typically called "bubbles" in the pipeline.

In single-threaded processors, a common method for reducing pipeline bubbles is known as bypassing, whereby instead of writing the computed value back to the register file in the WB stage, the result is forwarded directly to the processor execution unit that requires it. This reduces but does not eliminate bubbles in deeply pipelined machines. Also, it generally requires dependency checking and bypassing hardware, which unduly increases processor cost and complexity.

It is also possible to reduce pipeline stalls through the use of multithreading. Multithreaded processors are processors that support simultaneous execution of multiple distinct instruction sequences or "threads." Conventional threading techniques are described in, for example, M. J. Flynn, "Computer Architecture: Pipelined and Parallel Processor Design," Jones and Bartlett Publishers, Boston, Mass., 1995, and G. A. Blaauw and Frederick P. Brooks, "Computer Architecture: Concepts and Evolution," Addison-Wesley, Reading, Mass., 1997, both of which are incorporated by reference herein.

However, these and other conventional approaches generally do not allow multiple concurrent pipelines per thread, nor do they support pipeline shifting.

Accordingly, techniques are needed which can provide improved pipelining in a multithreaded digital data processor.

SUMMARY OF THE INVENTION

The present invention in an illustrative embodiment provides a multithreaded processor which advantageously allows multiple concurrent pipelines per thread, and also supports pipeline shifting.

In accordance with one aspect of the invention, a multithreaded processor comprises a plurality of hardware thread units, an instruction decoder coupled to the thread units for decoding instructions received therefrom, and a plurality of execution units for executing the decoded instructions. The multithreaded processor is configured for controlling an instruction issuance sequence for threads associated with respective ones of the hardware thread units. On a given processor clock cycle, only a designated one of the threads is permitted to issue one or more instructions, but the designated thread that is permitted to issue instructions varies over a plurality of clock cycles in accordance with the instruction issuance sequence. The instructions are pipelined in a manner which permits at least a given one of the threads to support multiple concurrent instruction pipelines.

In the illustrative embodiment, the instruction issuance sequence is determined using a token triggered threading approach. More specifically, in an arrangement in which the processor supports N threads, over a sequence of N consecutive processor clock cycles each of the N threads is permitted to issue instructions on only a corresponding one of the N consecutive processor clock cycles.

The illustrative embodiment allows each of the threads to issue up to three instructions on its corresponding one of the processor clock cycles. The instructions are pipelined such that at least five separate instruction pipelines can be concurrently executing for different ones of the threads.

The pipelined instructions in the illustrative embodiment include a load/store instruction, an arithmetic logic unit instruction, an integer multiplication instruction, a vector multiplication instruction, and a vector multiplication and reduction instruction.

In accordance with another aspect of the invention, the vector multiplication and reduction instruction is pipelined using a number of stages which is greater than a total number of threads of the processor. For example, the vector multiplication and reduction instruction may comprise a pipeline with at least eleven stages, including an instruction decode stage, a vector register file read stage, at least two multiply stages, at least two add stages, an accumulator read stage, a plurality of reduction stages, and an accumulator writeback stage. The accumulator read stage may be combined with another of the stages, such as an add stage. Pipelines for respective vector multiplication and reduction instructions may be shifted relative to one another by a plurality of pipeline stages.

The present invention in the illustrative embodiment provides a number of significant advantages over conventional techniques. For example, a higher degree of concurrency is provided than that achievable using conventional approaches. Also, the need for dependency checking and bypassing hardware is eliminated, since computation results are guaranteed to be written back to the appropriate register file before they are needed by the next instruction from the same thread. Furthermore, the techniques help to limit processor power consumption.

BRIEF DESCRIPTION OF THE DRAWINGS

The teachings of the present invention can be readily understood by considering the following detailed description in conjunction with the accompanying drawings, in which:

FIG. 6 shows a number of example pipelines in an embodiment of the invention; and FIG. 7 illustrates the manner in which pipelines can be shifted to permit computation cycles which are longer than issue cycles, in accordance with one embodiment of the invention.

DETAILED DESCRIPTION OF THE INVENTION

The present invention will be described in the context of an exemplary multithreaded processor. It should be understood, however, that the invention does not require the particular arrangements shown, and can be implemented using other types of digital data processors and associated processing circuitry.

A given processor as described herein may be implemented in the form of one or more integrated circuits.

The present invention in an illustrative embodiment provides a pipelining technique suitable for use in a multithreaded processor. With this technique, multiple instructions from multiple threads can be concurrently executed in an efficient manner. As will be described in greater detail below, the illustrative embodiment uses variable length execution pipelines, staggered execution, and rotated start execution, to provide concurrent execution while maintaining low power operation. The illustrative embodiment provides a higher degree of concurrency than that are achievable using conventional approaches.

Figure 3:
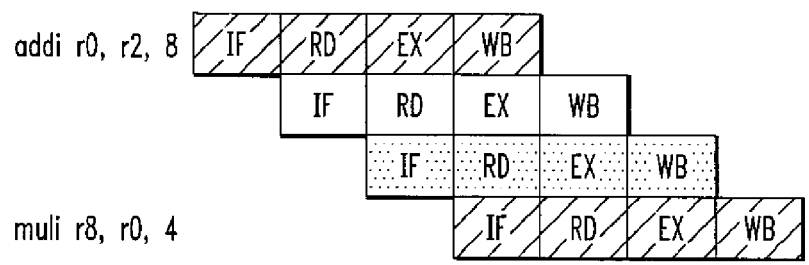
FIG. 3 shows an example of a pipeline of a multithreaded pipelined processor in an embodiment of the invention.

FIG. 3 shows an example of a multithreaded pipeline that removes the "bubbles" that are introduced through pipelined execution. As in the previous examples herein, it is assumed for simplicity and clarity of illustration in this example that the issued instructions each include the same four pipeline stages, namely, IF, RD, EX and WB. It is further assumed that there are three threads, and thus three hardware thread units or "contexts" issuing instructions in a sequential manner. In a typical implementation of a multithreaded processor, a given thread can generally be viewed in terms of hardware as well as software. The particular processor hardware associated with a given thread is therefore more particularly referred to herein as a hardware thread unit or simply a "context."

In this example, an integer add instruction addi r0, r2, 8 is initially issued by a first one of the contexts on a first clock cycle. The other two contexts issue instructions on respective subsequent clock cycles. It takes a total of three clock cycles for each of the contexts to issue an instruction. On a fourth clock cycle, the first context issues another instruction, namely an integer multiplication instruction muli r8, r0, 4.

More specifically, in cycle 1, the IF stage of thread 1 is executed for the addi instruction. In cycle 2, the IF stage of thread 2 executes while at the same time the RD stage of thread 1 executes. In cycle 3, the IF stage of thread 3 executes, the RD stage of thread 2 executes, and the EX stage of thread 1 executes. In cycle 4, the IF stage of thread 1 of the muli instruction executes concurrently with the WB stage of the addi instruction. Simultaneously, the EX stage of thread 2 executes and the RD stage of thread 3 executes.

It can be seen from this example that multiple instructions from the same and different threads are overlapped and concurrently executing. It can also be seen that there are no bubbles in the pipeline even though the results of the addi instruction are required by the muli instruction. The FIG. 3 example therefore serves to illustrate that with an appropriately-configured pipeline and a sufficient number of threads, all hardware contexts may be executing concurrently even though there is only a single instruction issued per context per cycle. The particular number of threads and pipeline stages are purposes of illustration only, and not intended to reflect a preferred implementation. Those skilled in the art will be readily able to determine an appropriate number of threads and pipeline stages for a particular application given the teachings provided herein.

As indicated previously, the present invention can be advantageously implemented in a multithreaded processor. A more particular example of a multithreaded processor in which the invention may be implemented is described in U.S. patent application Ser. No. 10/269,372, filed Oct. 11, 2002 and entitled "Multithreaded Processor With Efficient Processing For Convergence Device Applications," which is commonly assigned herewith and incorporated by reference herein. This multithreaded processor may be configured to execute RISC-based control code, DSP code, Java code and network processing code. It includes a single instruction multiple data (SIMD) vector processing unit, a reduction unit, and long instruction word (LIW) compounded instruction execution. Examples of threading and pipelining techniques suitable for use with this exemplary multithreaded processor are described in U.S. patent application Ser. No. 10/269,245, filed Oct. 11, 2002 and entitled "Method and Apparatus for Token Triggered Multithreading," now issued as U.S. Pat. No. 6,842,848, which is commonly assigned herewith and incorporated by reference herein.

The invention can be implemented in other multithreaded processors, or more generally other types of digital data processors. Another such processor will now be described with reference to FIG. 4.

Figure 4:
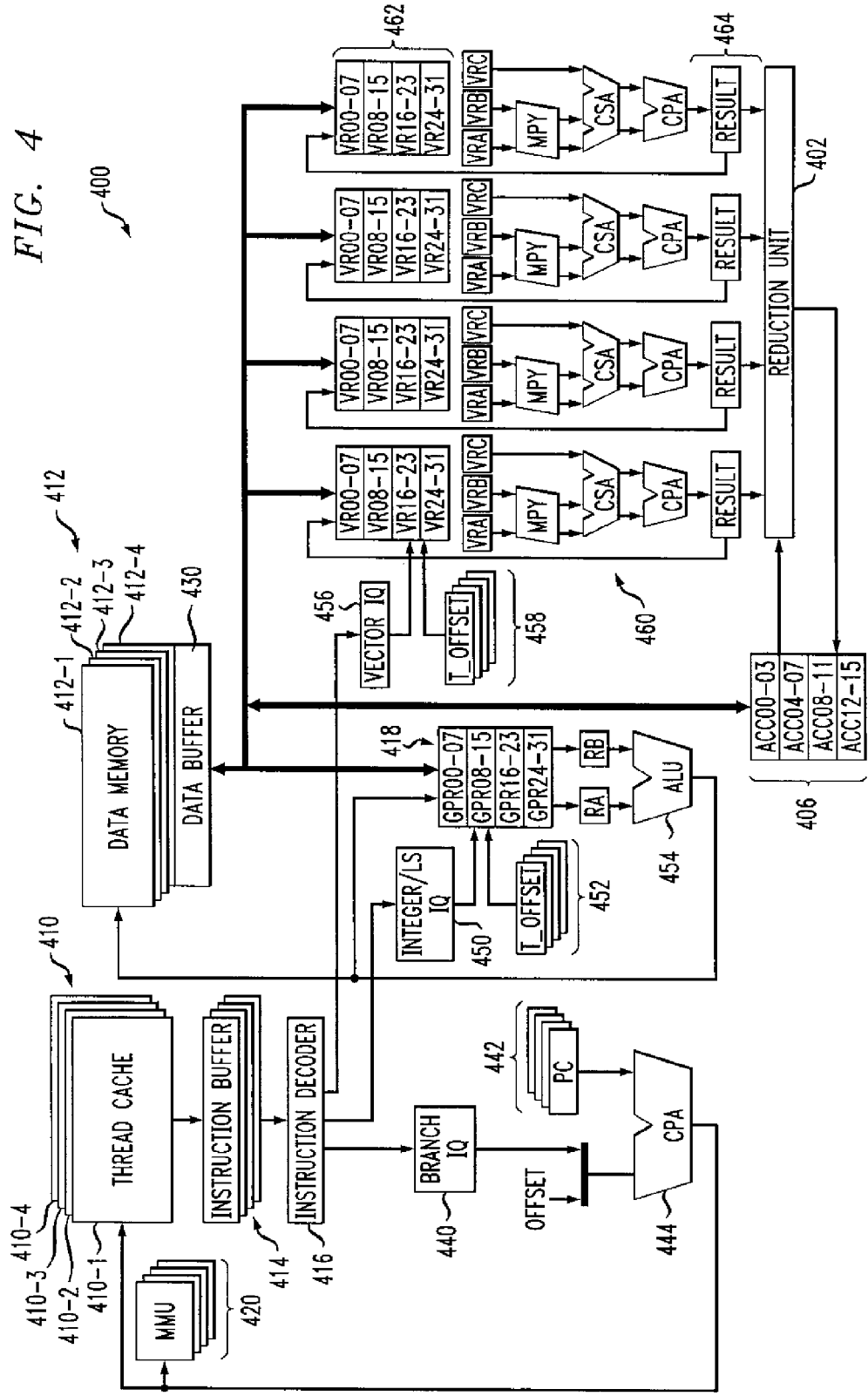
FIG. 4 shows an example of a multithreaded processor in which the present invention may be implemented.

FIG. 4 shows an example of a multithreaded processor 400 incorporating a reduction unit 402 and an accumulator register file 406. The processor 400 is generally similar to that described in U.S. patent application Ser. No. 10/269,372, but incorporates reduction unit 402 and accumulator register file 406 configured as described in the above-cited U.S. patent application Ser. No. 10/841,261.

The multithreaded processor 400 includes, among other elements, a multithreaded cache memory 410, a multithreaded data memory 412, an instruction buffer 414, an instruction decoder 416, a register file 418, and a memory management unit (MMU) 420. The multithreaded cache 410 includes a plurality of thread caches 410-1, 410-2, . . . 410-N, where N generally denotes the number of threads supported by the multithreaded processor 400, and in this particular example is given by N=4. Of course, other values of N may be used, as will be readily apparent to those skilled in the art.

Each thread thus has a corresponding thread cache associated therewith in the multithreaded cache 410. Similarly, the data memory 412 includes N distinct data memory instances, denoted data memories 412-1, 412-2, . . . 412-N as shown.

The multithreaded cache 410 interfaces with a main memory (not shown) external to the processor 400 via the MMU 420. The MMU 420, like the cache 410, includes a separate instance for the each of the N threads supported by the processor. The MMU 420 ensures that the appropriate instructions from main memory are loaded into the multithreaded cache 410.

The data memory 412 is also typically directly connected to the above-noted external main memory, although this connection is also not explicitly shown in the figure. Also associated with the data memory 412 is a data buffer 430.

In general, the multithreaded cache 410 is used to store instructions to be executed by the multithreaded processor 400, while the data memory 412 stores data that is operated on by the instructions. Instructions are fetched from the multithreaded cache 410 by the instruction decoder 416 and decoded. Depending upon the instruction type, the instruction decoder 416 may forward a given instruction or associated information to various other units within the processor, as will be described below.

The processor 400 includes a branch instruction queue (IQ) 440 and program counter (PC) registers 442. The program counter registers 442 include one instance for each of the threads. The branch instruction queue 440 receives instructions from the instruction decoder 416, and in conjunction with the program counter registers 442 provides input to an adder block 444, which illustratively comprises a carry-propagate adder (CPA). Elements 440, 442 and 444 collectively comprise a branch unit of the processor 400. Although not shown in the figure, auxiliary registers may also be included in the processor 400.

The register file 418 provides temporary storage of integer results. Instructions forwarded from the instruction decoder 416 to an integer instruction queue (IQ) 450 are decoded and the proper hardware thread unit is selected through the use of an offset unit 452 which is shown as including a separate instance for each of the threads. The offset unit 452 inserts explicit bits into register file addresses so that independent thread data is not corrupted. For a given thread, these explicit bits may comprise, e.g., a corresponding thread identifier.

As shown in the figure, the register file 418 is coupled to input registers RA and RB, the outputs of which are coupled to an arithmetic logic unit (ALU) block 454, which may comprise an adder. The input registers RA and RB are used in implementing instruction pipelining. The output of the ALU block 454 is coupled to the data memory 412.

The register file 418, integer instruction queue 450, offset unit 452, elements RA and RB, and ALU block 454 collectively comprise an exemplary integer unit.

Instruction types executable in the processor 400 include Branch, Load, Store, Integer and Vector/SIMD instruction types. If a given instruction does not specify a Branch, Load, Store or Integer operation, it is a Vector/SIMD instruction. Other instruction types can also or alternatively be used. The Integer and Vector/SIMD instruction types are examples of what are more generally referred to herein as integer and vector instruction types, respectively.

A vector IQ 456 receives Vector/SIMD instructions forwarded from the instruction decoder 416. A corresponding offset unit 458, shown as including a separate instance for each of the threads, serves to insert the appropriate bits to ensure that independent thread data is not corrupted.

A vector unit 460 of the processor 400 is separated into N distinct parallel portions, and includes a vector file 462 which is similarly divided. The vector file 462 includes thirty-two registers, denoted VR00 through VR31. The vector file 462 serves substantially the same purpose as the register file 418 except that the former operates on Vector/SIMD instruction types.

The vector unit 460 illustratively comprises the vector instruction queue 456, the offset unit 458, the vector file 462, and the arithmetic and storage elements associated therewith.

The operation of the vector unit 460 is as follows. A Vector/SIMD block encoded either as a fractional or integer data type is read from the vector file 462 and is stored into architecturally visible registers VRA, VRB, VRC. From there, the flow proceeds through multipliers (MPY) that perform parallel concurrent multiplication of the Vector/SIMD data. Adder units comprising carry-skip adders (CSAs) and CPAs may perform additional arithmetic operations. For example, one or more of the CSAs may be used to add in an accumulator value from a vector register file, and one or more of the CPAs may be used to perform a final addition for completion of a multiplication operation, as will be appreciated by those skilled in the art. Computation results are stored in Result registers 464, and are provided as input operands to the reduction unit 402. The reduction unit 402 sums the input operands in such a way that the summation result produced is the same as that which would be obtained if each operation were executed in series. The reduced sum is stored in the accumulator register file 406 for further processing.

When performing vector dot products, the MPY blocks perform four multiplies in parallel, the CSA and CPA units perform additional operations or simply pass along the multiplication results for storage in the Result registers 464, and the reduction unit 402 sums the multiplication results, along with an accumulator value stored in the accumulator register file 406. The result generated by the reduction unit is then stored in the accumulator register file for use in the next iteration, in the manner previously described.

The accumulator register file 406 in this example includes a total of sixteen accumulator registers denoted ACC00 through ACC15.

The multithreaded processor 400 may make use of techniques for thread-based access to register files, as described in U.S. patent application Ser. No. 10/269,373, filed Oct. 11, 2002 and entitled "Method and Apparatus for Register File Port Reduction in a Multithreaded Processor," which is commonly assigned herewith and incorporated by reference herein.

The multithreaded processor 400 is well suited for use in performing vector dot products and other types of parallel vector multiply and reduce operations, as described in the above-cited U.S. patent application Ser. No. 10/841,261.

The illustrative embodiment of the present invention utilizes an approach known as token triggered threading. Token triggered threading is described in the above-cited U.S. patent application Ser. No. 10/269,245, now issued as U.S. Pat. No. 6,842,848. The token triggered threading typically assigns different tokens to each of a plurality of threads of a multithreaded processor. For example, the token triggered threading may utilize a token to identify in association with a current processor clock cycle a particular one of the threads of the processor that will be permitted to issue an instruction for a subsequent clock cycle.

Figure 5:
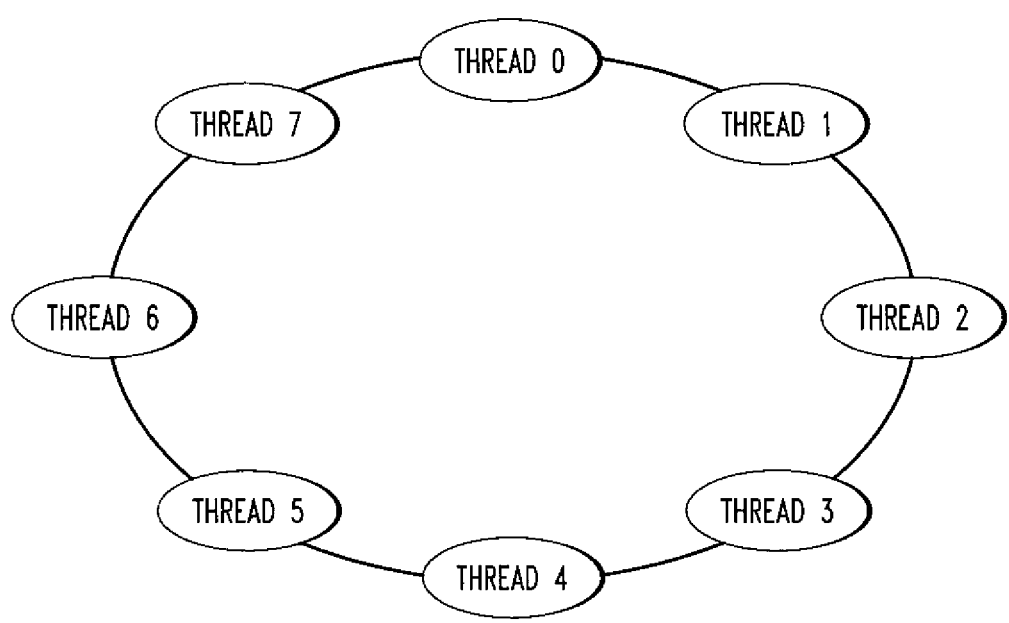
FIG. 5 is a diagram illustrating an example token triggered multithreading approach that may be utilized in an embodiment of the invention.

FIG. 5 shows an example of token triggered threading for an implementation of a multithreaded processor in which the number of threads N is eight. In general, all of the threads operate simultaneously, and each accesses a corresponding instance of the thread cache 110 and data memory 112. As shown in FIG. 5, the eight threads are denoted Thread 0, Thread 1, Thread 2, . . . Thread 7, and are illustrated as being serially interconnected in the form of a ring.

In accordance with the token triggered threading illustrated in FIG. 5, all of the hardware thread units or contexts are permitted to simultaneously execute instructions, but only one context may issue an instruction in a particular clock cycle of the processor. In other words, all contexts execute simultaneously but only one context is active on a particular clock cycle. Therefore, if there are a total of C contexts it will require C clock cycles to issue an instruction from all contexts. Each clock cycle, one of the contexts issues an instruction, and the next thread to issue an instruction is indicated by a token.

In the FIG. 5 example, the tokens are arranged in a sequential or round-robin manner, such that the contexts will issue instructions sequentially. However, tokens indicating the next context to issue an instruction may be arranged using other patterns, such as an alternating even-odd pattern. Also, as noted above, other types of threading may be used in conjunction with the present invention.

Although token triggered threading is used in the illustrative embodiment, the invention does not require this particular type of multithreading, and other types of multithreading techniques can be used.

FIG. 6 illustrates the manner in which example instruction functions may be pipelined in the multithreaded processor 400 in accordance with the present invention. In the illustrative embodiment of the invention, this type of pipelining is preferably utilized in conjunction with the token triggered threading described previously, but it is to be appreciated that numerous other combinations of pipelining and threading may be used in implementing the invention.

The figure depicts example pipelines for Load/Store (Ld/St), Arithmetic Logic Unit (ALU), Integer Multiplication (I_Mul), Vector Multiplication (V_Mul), and Vector Multiplication and Reduction (V_Mul Reduce) instructions. In this implementation, up to three pipelines may be simultaneously started and all five may be in various phases of execution concurrently.

The Ld/St pipeline has nine stages, denoted stage 0 through stage 8. In the first stage, stage 0 (Inst Dec), an instruction is fetched and decoded. This stage is common to all five pipelines and determines which queue the instructions should be routed to. In stage 1 (RF Read), the register file operands are read. This will form the base address for the load or store operation. In the case of a store instruction, the data to be stored is also read. In stage 2 (Agen), any immediate values are added to the address and the full address is generated. In stage 3 (Xfer), the computed address is transferred to the memory subsystem. In stage 4 (Int/Ext), a determination is made as to whether the memory access is to internal or external memory. In stages 5-7 (Mem0, Mem1, Mem2), the value is read from or written to memory. In stage 8 (WB), the value read from memory on a Load instruction is written into the register file.

The ALU pipeline has seven stages, denoted stage 0 through stage 6. As in the Ld/St pipeline, the first stage, stage 0 (Inst Dec), fetches and decodes all instructions. In stage 1 (Wait), a wait cycle is inserted. This allows the Ld/St and ALU hardware to share the same register file read ports. In the following stage, stage 2 (RF Read), the operands for the arithmetic function are read from the register file. Stages 3 and 4 (Exec1, Exec2) then compute the arithmetic result (e.g., an add, compare, shift, etc.). In stage 5 (Xfer), the result is transferred to the register file. In stage 6 (WB), the result is written back into the register file.

The I_Mul pipeline is similar to the ALU pipeline, as they share common architected resources. The figure indicates that the pipeline stages are identical except for an additional execution stage (Exec 3) in the I_Mul pipeline. Thus, an additional cycle is available for computing the result of a multiply.

The V_Mul pipeline uses different architected resources than the previously-described ALU and I_Mul pipelines. It may therefore execute concurrently with those instructions without resource conflicts. Stage 0 (Inst Dec) is as in all instructions and allows for routing of the decoded instruction to the correct pipeline. In stage 1 (VRF Read) the vector register file operands are read. Stages 2-5 (MPY1, MPY2, Add1, Add2) perform the multi-element vector arithmetic. The two add stages are present to convert the multiplication results from carry-save format back into two's complement format. Additionally, if the vectors only require simple arithmetic, this can be performed in the add stages. In stage 6 (Xfer), the results are transferred back to the vector register file, and in stage 7 (WB), the results are written back.

The V_Mul Reduce pipeline is similar to the V_Mul pipeline except that an additional reduction operation is performed. The reduction takes the 4 vector element products, along with an accumulator operand, and reduces them to a single scalar element. Typically this involves adding all of the products to the accumulator or subtracting all of the products from the accumulator, although other combinations are possible. The V_Mul and V_Mul Reduce pipelines are the same until stage 5. In stage 5 (Add2, ACC Read), an additional architected accumulator register file is read. This value is arithmetically combined with the vector elements and reduced to a single scalar. Four stages (Reduce1, Reduce2, Reduce3, Reduce4) are devoted to this reduction and then the scalar value is written back to the accumulator register file (i.e., a different architected space from the vector register file) in stage 10 (ACC WB).

Figure 1A:
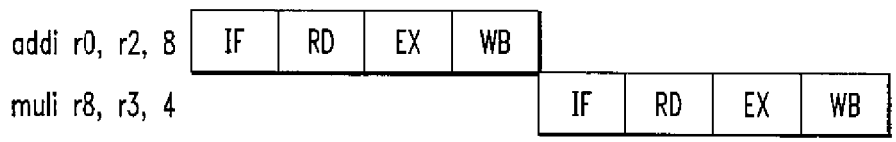
FIGS. 1A and 1B show examples of instruction execution using conventional approaches.
Figure 1B:
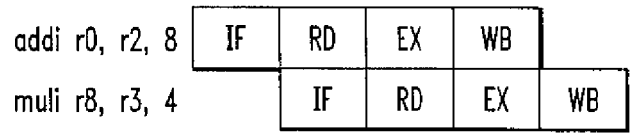
Figure 2:
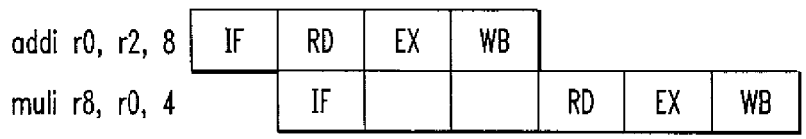
FIG. 2 illustrates the manner in which stalls can occur in a conventional processor pipeline.

If a single thread issued instructions each cycle as in FIG. 2, bubbles would be induced in the pipeline. However, just as in the simplified case shown in FIG. 3 where there is only one type of pipeline, in the illustrative embodiment all five of the processor pipelines are interleaved and multithreaded to avoid bubbles. Each hardware thread unit issues up to three instructions in accordance with token triggered threading as shown in FIG. 5. This ensures that no threads stall and all threads will complete without deadlock.

As mentioned previously, in this implementation, all five processor pipelines may be simultaneously active with instructions from multiple hardware thread units. This fills potential bubbles in the pipeline with work from other thread units.

It should be noted that a given V_Mul Reduce pipeline may be shifted in locality from a V_Mul pipeline in that the back-to-back reduction operations of the V_Mul Reduce pipeline do not cause bubbles. It appears that such a shift might lead to pipeline bubbles because the V_Mul Reduce pipeline is longer in duration than the number of hardware thread units (eight in this implementation). In other words, the computational cycle of the pipeline (eleven clock cycles for V_Mul Reduce) is longer than the issue cycle (each thread gets to issue once every eight clock cycles). In fact, this does not happen because the accumulator register file read phase is shifted from the V_Mul pipeline computations.

FIG. 7 illustrates the manner in which multiple V_Mul Reduce pipelines can be shifted relative to one another so as to permit computation cycles which are longer than issue cycles. Note that the figure starts from cycle 5 of the first V_Mul Reduce instruction. Since there are eight thread units in this implementation, the next V_Mul Reduce instruction will issue on cycle 8. As can be seen in the figure, the accumulator register file is written back in cycle 10. The operands, however, are not read by the second instruction until cycle 13. The second V_Mul Reduce pipeline can be thought of as being shifted in locality from the first V_Mul Reduce pipeline. This allows the lengthening of execution phases without causing bubbles in the pipeline.

The illustrative embodiment described above advantageously allows multiple concurrent pipelines per thread and provides for pipeline shifting in deeply multithreaded pipelines. It also eliminates the need for dependency checking and bypassing hardware, since results are guaranteed to be written back to the register file before they are needed by the next instruction from the same thread.

It should be noted that the particular processor, multithreading, pipelining and shifting arrangements shown in the figures are presented by way of illustrative example only, and additional or alternative elements not explicitly shown may be included, as will be apparent to those skilled in the art.

It should also be emphasized that the present invention does not require the particular multithreaded processor configuration shown in FIG. 4. The invention can be implemented in a wide variety of other multithreaded processor configurations.

Thus, the above-described embodiments of the invention are intended to be illustrative only, and numerous alternative embodiments within the scope of the appended claims will be apparent to those skilled in the art. For example, the particular arrangement of hardware thread units, instruction decoder and execution units shown in FIG. 4 may be altered in other embodiments, and the invention should not be construed as requiring any particular type or arrangement of such elements. Also, as noted above, pipeline configurations, threading types and instruction formats may be varied to accommodate the particular needs of a given application.

What is claimed is:

1. A multithreaded processor comprising:
   a hardware thread unit including a memory unit;
   an instruction decoder coupled to the hardware thread unit; and
   a plurality of execution units coupled to the instruction decoder, the execution units including an interleaved multithreaded instruction pipeline configured to process instructions issued in an instruction issuance sequence for a plurality of threads for a plurality of hardware thread units, the interleaved multithreaded instruction pipeline having execution stages concurrently executable for a first instruction and a second instruction issued by a program thread for an execution unit;
   wherein the execution unit independently executes the decoded instructions of the program thread to completion in the order the first instruction and the second instruction are received;
   wherein on a processor clock cycle one of the plurality of threads is permitted to issue instructions, the thread permitted to issue instructions varying over a plurality of clock cycles in accordance with the instruction issuance sequence;
   wherein the instructions are pipelined to permit a thread to support multiple concurrent instruction pipelines; and
   wherein the pipelined instructions include an instruction having a pipeline with a computational cycle which is longer than an instruction issue cycle of the multithreaded processor, and wherein results for a first instruction for a program thread are always written to a register file before the results are needed by a second instruction for the program thread without stalling the second instruction and without dependency checking and bypassing hardware.

2. The multithreaded processor of claim 1, wherein the pipelined instructions include a load-store instruction, an arithmetic logic unit instruction, an integer multiplication instruction, a vector multiplication instruction, and a vector multiplication and reduction instruction.

3. The multithreaded processor of claim 2, wherein the arithmetic logic unit instruction has a pipeline including a wait stage between an instruction decode stage and a register file read stage thereof, the wait stage permitting the load-store instruction and the arithmetic logic instruction to share a set of register file read ports.

4. The multithreaded processor of claim 2, wherein the integer multiplication instruction has a pipeline including a wait stage between an instruction decode stage and a register file read stage thereof, the wait stage permitting the integer multiplication instruction and the load-store instruction to share a set of register file read ports.

5. The multithreaded processor of claim 2, wherein the vector multiplication instruction utilizes a different set of execution unit resources than the arithmetic logic unit and integer multiplication instructions, and can therefore execute concurrently with either of said instructions.

6. The multithreaded processor of claim 2, wherein the vector multiplication and reduction instruction is pipelined using a number of stages which is greater than a total number of threads of the processor.

7. The multithreaded processor of claim 1, wherein the instruction issuance sequence is determined using token triggered threading.

8. The multithreaded processor of claim 7, wherein processor supports N threads, and over a sequence of N consecutive processor clock cycles each of the N threads is permitted to issue instructions on only a corresponding one of the N consecutive processor clock cycles.

9. The multithreaded processor of claim 2, wherein the vector multiplication and reduction instruction includes an instruction decode stage, a vector register file read stage, at least two multiply stages, at least two add stages, an accumulator read stage, a plurality of reduction stages, and an accumulator writeback stage.

10. The multithreaded processor of claim 9, wherein the accumulator read stage is combined with an add stage.

11. The multithreaded processor of claim 2, wherein pipelines for a first vector multiplication and reduction instruction and a second vector multiplication and reduction instruction are shifted relative to one another by a plurality of pipeline stages.

12. The multithreaded processor of claim 1, wherein the instruction decoder is configurable to decode very long instruction word (VLIW) type instructions in a first mode of operation.

13. The multithreaded processor of claim 1, wherein the instruction decoder is configurable to decode superscalar type instructions in a second mode of operation.

14. The multithreaded processor of claim 2, wherein the interleaved multithreaded instruction pipeline for vector multiplication and reduction instructions comprises:
 a first reduce stage concurrently executable with an instruction decode stage;
 a second reduce stage concurrently executable with a vector register file read stage; and
 an accumulator writeback stage concurrently executable with a multiplication stage for a first instruction and a second instruction issued by a program thread.

15. A digital data processing device, comprising:
 a digital signal processor;
 wherein the digital signal processor includes:
 a hardware thread unit comprising a memory unit;
 an instruction decoder coupled to the hardware thread unit; and
 a plurality of execution units coupled to the instruction decoder, the execution units including an interleaved multithreaded instruction pipeline configured to process instructions issued in an instruction issuance sequence for a plurality of threads for a plurality of hardware thread units, the interleaved multithreaded instruction pipeline having execution stages concurrently executable for a first instruction and a second instruction issued by a program thread for an execution unit;
 wherein the execution unit independently executes the decoded instructions of the program thread to completion in the order the first instruction and the second instruction are received;
 wherein on a processor clock cycle one of the plurality of threads is permitted to issue instructions, the thread permitted to issue instructions varying over a plurality of clock cycles in accordance with the instruction issuance sequence;
 wherein the instructions are pipelined to permit a thread to support multiple concurrent instruction pipelines; and
 wherein the pipelined instructions include an instruction having a pipeline with a computational cycle which is longer than an instruction issue cycle of the multithreaded processor, and wherein results for a first instruction for a program thread are always written to a register file before the results are needed by a second instruction for the program thread without stalling the second instruction and without dependency checking and bypassing hardware.

16. A method for use in a multithreaded processor including a hardware thread unit comprising at least one memory unit, an instruction decoder coupled to the hardware thread unit, and a plurality of execution units coupled to the instruction decoder, the method comprising the steps of:
 issuing one or more instructions from a designated thread on a processor clock cycle;
 varying the thread issuing instructions over a plurality of clock cycles using an instruction issuance sequence; and
 pipelining the instructions to permit a thread to support multiple concurrent instruction pipelines,
 wherein pipelining the instructions comprises execution stages concurrently executable for a first instruction and a second instruction issued by a program thread for an execution unit, and
 wherein the execution unit independently executes the decoded instructions of the program thread to completion in the order the first instruction and the second instruction are received;
 wherein the pipelined instructions include an instruction having a pipeline with a computational cycle which is longer than an instruction issue cycle of the multithreaded processor, and wherein results for a first instruction for a program thread are always written to a register file before the results are needed by a second instruction for the program thread without stalling the second instruction and without dependency checking and bypassing hardware.

17. The method of claim 16, wherein pipelining instructions includes pipelining a load-store instruction, an arithmetic logic unit instruction, an integer multiplication instruction, a vector multiplication instruction, and a vector multiplication and reduction instruction.

18. The method of claim 17, wherein pipelining the arithmetic logic unit instruction includes a wait stage between an instruction decode stage and a register file read stage thereof, the wait stage permitting the load-store instruction and the arithmetic logic instruction to share a set of register file read ports.

19. The method of claim 17, wherein pipelining the integer multiplication instruction includes a wait stage between an instruction decode stage and a register file read stage thereof, the wait stage permitting the integer multiplication instruction and the load-store instruction to share a set of register file read ports.

20. The method of claim 17, wherein execution of vector multiplication instruction utilizes a different set of execution unit resources than execution of arithmetic logic unit and integer multiplication instructions, and can therefore execute concurrently with either of said instructions.

21. The method of claim 17, wherein pipelining the vector multiplication and reduction instruction uses a number of stages which is greater than a total number of threads of the processor.

22. The method of claim 16, wherein the instruction issuance sequence is determined using token triggered threading.

23. The method of claim 17, wherein pipelining the vector multiplication and reduction instruction includes an instruction decode stage, a vector register file read stage, at least two multiply stages, at least two add stages, an accumulator read stage, a plurality of reduction stages, and an accumulator writeback stage.

24. The method of claim 23, wherein pipelining includes combining the accumulator read stage with an add stage.

25. The method of claim 17, wherein pipelining a first vector multiplication and reduction instruction and a second vector multiplication and reduction instruction includes shifting the instructions relative to one another by a plurality of pipeline stages.

26. The method of claim 16, wherein the instruction decoder is configurable to decode very long instruction word (VLIW) type instructions in a first mode of operation.

27. The method of claim 16, wherein the instruction decoder is configurable to decode superscalar type instructions in a second mode of operation.

28. The method of claim 17, wherein pipelining a vector multiplication and reduction instructions comprises:
   a first reduce stage concurrently executable with an instruction decode stage;
   a second reduce stage concurrently executable with a vector register file read stage; and
   an accumulator writeback stage concurrently executable with a multiplication stage for a first instruction and a second instruction issued by a program thread.

29. A multithreaded processor comprising:
   means for controlling a plurality of threads, including means for storing data;
   means for issuing instructions in an instruction issuance sequence for a plurality of threads;
   means for decoding instructions fetched; and
   means for executing the decoded instructions, including means for interleaved multithreaded instruction pipelining having execution stages concurrently executable for a first instruction and a second instruction issued by a program thread for an execution unit;
   wherein the means for executing the decoded instructions independently executes the decoded instructions of the program thread to completion in the order the first instruction and the second instruction are received;
   wherein on a processor clock cycle one of the plurality of threads is permitted to issue instructions, the thread permitted to issue instructions varying over a plurality of clock cycles in accordance with the means for issuing instructions sequentially; and
   wherein the instructions are pipelined to permit a thread to support multiple concurrent instruction pipelines; and
   wherein the pipelined instructions include an instruction having a pipeline with a computational cycle which is longer than an instruction issue cycle of the multithreaded processor, and wherein results for a first instruction for a program thread are always written to a register file before the results are needed by a second instruction for the program thread without stalling the second instruction and without dependency checking and bypassing hardware.

* * * * *